(12) United States Patent
Pellmann et al.

(10) Patent No.: US 8,511,744 B2
(45) Date of Patent: Aug. 20, 2013

(54) BODY STRUCTURE FOR AN AUTOMOBILE AND METHOD FOR PRODUCING A STRUCTURAL COMPONENT FOR A BODY STRUCTURE

(75) Inventors: Markus Pellmann, Sassenberg (DE); Christian Hielscher, Delbrück (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 241 days.

(21) Appl. No.: 13/085,024

(22) Filed: Apr. 12, 2011

(65) Prior Publication Data
US 2011/0254315 A1 Oct. 20, 2011

(30) Foreign Application Priority Data
Apr. 14, 2010 (DE) .......................... 10 2010 015 000

(51) Int. Cl.
*B60N 99/00* (2006.01)
(52) U.S. Cl.
USPC .................................................... 296/193.06
(58) Field of Classification Search
USPC ................................ 296/187.01, 191, 193.06
See application file for complete search history.

(56) References Cited

U.S. PATENT DOCUMENTS

| | | | | |
|---|---|---|---|---|
| 5,382,071 A | * | 1/1995 | Enning et al. | 296/203.03 |
| 5,398,989 A | * | 3/1995 | Winter et al. | 296/203.03 |
| 5,916,389 A | | 6/1999 | Lundström | |
| 6,332,643 B1 | * | 12/2001 | Sukegawa et al. | 296/203.03 |
| 2008/0196800 A1 | | 8/2008 | Beenken et al. | |
| 2009/0162688 A1 | | 6/2009 | Handing et al. | |
| 2009/0250967 A1 | * | 10/2009 | Bodin | 296/187.01 |
| 2009/0320968 A1 | | 12/2009 | Boeke et al. | |

FOREIGN PATENT DOCUMENTS

| | | |
|---|---|---|
| DE | 197 23 655 B4 | 12/1997 |
| DE | 102005025026 | 10/2006 |
| DE | 102008030279 | 1/2010 |
| WO | WO 2010/076247 | 7/2010 |

OTHER PUBLICATIONS

"Leitfaden für Rettungsdienste Pkw", in: Daimler AG. Technische Informationen und Werstatteinrichtung, Feb. 2010.

* cited by examiner

*Primary Examiner* — Lori Lyjak
(74) *Attorney, Agent, or Firm* — Henry M. Feiereisen LLC

(57) ABSTRACT

On a body structure (2) for an automobile (1) having a structural component (3) made of at least high-strength steel sheet, the structural component (3) is provided with a predetermined cutting location (5, 5a, 5b, 5c) for applying a separating tool. In the method for producing the structural component (3), a steel sheet is formed and subjected to heat treatment for forming regions with high strength and reduced strength. At least one region of the structural component (3, 7, 8, 12) with reduced strength is formed as a predetermined cutting location (5, 5a, 5b, 5c) for applying a separating tool during a hot-forming process of a steel sheet in a tool or during heat treatment of the structural component (3, 7, 8, 12) following a forming process in a tool by changing the mechanical properties.

18 Claims, 1 Drawing Sheet

BODY STRUCTURE FOR AN AUTOMOBILE AND METHOD FOR PRODUCING A STRUCTURAL COMPONENT FOR A BODY STRUCTURE

CROSS-REFERENCES TO RELATED APPLICATIONS

This application claims the priority of German Patent Application, Serial No. 10 2010 015 000.2-56, filed Apr. 14, 2010, pursuant to 35 U.S.C. 119(a)-(d).

BACKGROUND OF THE INVENTION

The invention relates, on one hand, to a body structure for an automobile, which has a structural component made of at least high-strength steel sheet.

On the other hand, the invention is directed to a method for producing a structural component for a body structure of an automobile.

In the automobile industry, in particular in the production of passenger cars, there is an increasing tendency to produce various structural components of the body structure, such as for example roof columns (A-, B-, C-columns) door reinforcements or rocker panels from high-strength or ultra-high-strength steel sheets having sometimes values in excess of 1000 MPa. However, particularly this use of the steel sheets shows weaknesses if the doors of an automobile involved in an accident can no longer be opened for rescuing the passengers. It then becomes necessary to cut certain structural components of the body structure so that the body structure can be opened or pushed apart to then allow the passengers to be rescued.

Although it is generally possible to sever each structural component by exerting a certain effort, the problem remains that the cutting force necessitates increasing efforts due to the employed high-strength to ultra-high-strength steels. These increased demands then result in a weight increase of the cutting tool, associate with significantly reduced maneuverability. This reduced maneuverability in conjunction with an increasing strength of the component on the whole prolongs the time required to rescue the occupants, preventing possible injuries to be treated with the required urgency.

To shorten the rescue time as much as possible, persons in the technical field have contemplated to provide so-called rescue cards for each vehicle type. These rescue cards, which should then be carried in the automobile, should inter alia indicate those locations of the body structure (passenger compartment) where structural component are made of high-strength or ultra-high-strength steels and provide instructions for circumventing these structural components so that less strong structural components can be cut without causing considerable problems. However, increased use of these steels has made it increasingly more difficult to work around these structural components made of high-strength or ultra-high-strength steels.

It is therefore an object of the invention to provide, on one hand, a body structure for an automobile and, on the other hand, a method for producing a structural component made of high-strength sheet steel for the body structure of an automobile, which can still be easily cut in an emergency with separating or cutting tools.

SUMMARY OF THE INVENTION

According to one aspect of the invention, a body structure for an automobile includes a structural component made of a high-strength steel sheet, and a predetermined cutting location arranged on the structural component and constructed for engagement with a separating tool.

Accordingly, the structural component is now provided with a predetermined cutting location for applying a separating tool. This predetermined cutting location has a reduced strength compared to the rest of the structural component.

This approach then allows the car manufacturers to provide clear and unambiguous type-specific instructions, for example in form of rescue cards, which allow the rescuers, for example the fire department or the technical aid organizations, to engage the respective separating tools on the predetermined cutting locations without delay when an automobile is involved in an accident and the occupants are trapped, allowing the occupants to be rescued within a short time and any injuries to be treated. Special considerations regarding the location of low-strength sections of a body structure are then no longer required. Particularly complicated separating or cutting tools with their associated inferior maneuverability are then no longer required in spite of the use of high-strength or ultra-high-strength steels for the structural components.

The predetermined cutting locations can be provided on different structural components of the passenger compartment. In particular, the predetermined cutting locations can be located on structural components in form of a roof column. These refer to the A-, B-, C- and D-columns supporting the roof of a vehicle. The structural component may also be, for example, the rocker panel of an automobile. The predetermined cutting location is positioned depending on the position of the structural component. The thinnest location of the structural component of B-columns is typically located above the seat belt attachment. Preferably, the predetermined cutting location is located in this region. The other region of the A-column as well as the C-column is subject to high loads wherein a vehicle overturns. The predetermined cutting location is therefore preferably positioned in the lower region of the A-column and C-column. In addition, separating the A-column in the lower region, i.e., below the windowsill, makes it easier to rescue the occupants.

The occupants are frequently also trapped. In this case, the passenger compartment is partially expanded by jacking the vehicle up in the region of the A-column. At least the top side of the rocker panel is then cut, opening the top of the vehicle when the vehicle is jacked up. The inherent weight of the rear section and the front section causes the at least partially cut rocker panel to bend, so that the occupants can be rescued.

Principally, additional predetermined cutting locations are feasible on the structural components of the automobile, wherein the exact arrangement is always vehicle-specific, meaning commensurate with the requirements with respect to the loading of the structural components and the possibilities for rescuing the occupants.

With respect to minimizing the height of a separating tool, the predetermined cutting location may advantageously have a width of less than 100 mm. The region of a structural component with lower strength can then be limited to a minimum size.

Particularly advantageously, the predetermined cutting location may have a width of less than 75 mm, preferably less than 50 mm.

To further make it easier for the rescuers to find a predetermined cutting location, the predetermined cutting location may advantageously be detected with at least one sensor. In addition, the predetermined cutting location may be provided with a transponder to which the sensor reacts.

According to another aspect of the invention, a method for producing a structural component for a body structure of an automobile includes the steps of forming a steel sheet, and subjecting the formed steel sheet to a heat treatment for forming a first region having high strength and at least one second region having reduced strength. The at least one second region having reduced strength is formed as a predetermined cutting location of the structural component with reduced strength by changing mechanical properties either during a hot-forming process of the formed steel sheet in a tool or during a heat treatment of the structural component in a tool after the steel sheet is formed.

Accordingly, the region of the structural component with a lower strength is formed as a predetermined cutting location for applying a separating tool during a hot-forming process in a tool or during heat treatment following a forming process in a tool by changing the mechanical properties of the employed steel sheet. Such predetermined cutting location can then be precisely listed for each vehicle type on a rescue card, so that the rescuers involved in the rescue can approach the rescue operation with a lighter-weight separating and cutting tool, so that the persons involved in the accident can be rescued within a short time.

The lower strength in the region of a predetermined cutting location can be generated in a tool during hot-forming of the steel sheet by preventing contact between the predetermined cutting location and the tool. This intentional lack of contact between the regions of the predetermined cutting location and the tool reduces the cooling effect caused by the tool. The predetermined cutting location then remains above the critical cooling speed for martensitic hardening.

If due to this measure a lower tolerance for warpage is required due to the uneven temperature distribution in the structural component, then the region of the predetermined cutting location which is not in contact with the tool can be brought to the temperature of the remaining structural component after a critical cooling time, i.e., with reduced cooling speed.

The region of the predetermined cutting location can then be cooled with water or compressed air, preventing an uneven temperature distribution in the structural component.

During hot-forming of a steel sheet in the tool, the section of the tool adjacent to, but spaced apart from, the predetermined cutting location may also be heated for a limited time. This is advantageously performed by holding the region with the planned predetermined cutting location without making contact with the tool. The total processing time can be further reduced with the active heating.

To prevent warpage of the structural component, the section of the tool which is adjacent to, but spaced apart from the region of the predetermined cutting location may be cooled after heating.

During hot-forming of a steel sheet in the tool, a material with a lower thermal conductivity than the material of the rest of the tool may also be used in the region of the planned predetermined cutting location. This approach also prevents formation of a martensitic microstructure in the region of the predetermined cutting location in spite of the contact between the structural component and the tool.

In a heat treatment performed of the structural component after the forming process of a steel sheet in the tool, the region with the predetermined cutting location is subjected to a tempering or soft-annealing operation for a limited time. Heating can be locally confined, for example, through induction, heated mold platens, heating with a burner, resistance heating, infrared heating or similar measures.

To enable the rescuers to clearly identify the predetermined cutting location, particularly in confusing and possibly poorly illuminated situations, a transponder responding to a sensor can be arranged in the region of the structural component according to the invention. The invention will now be described based on exemplary embodiment illustrated in the drawing.

DETAILED DESCRIPTION OF PREFERRED EMBODIMENTS

Figure 1:
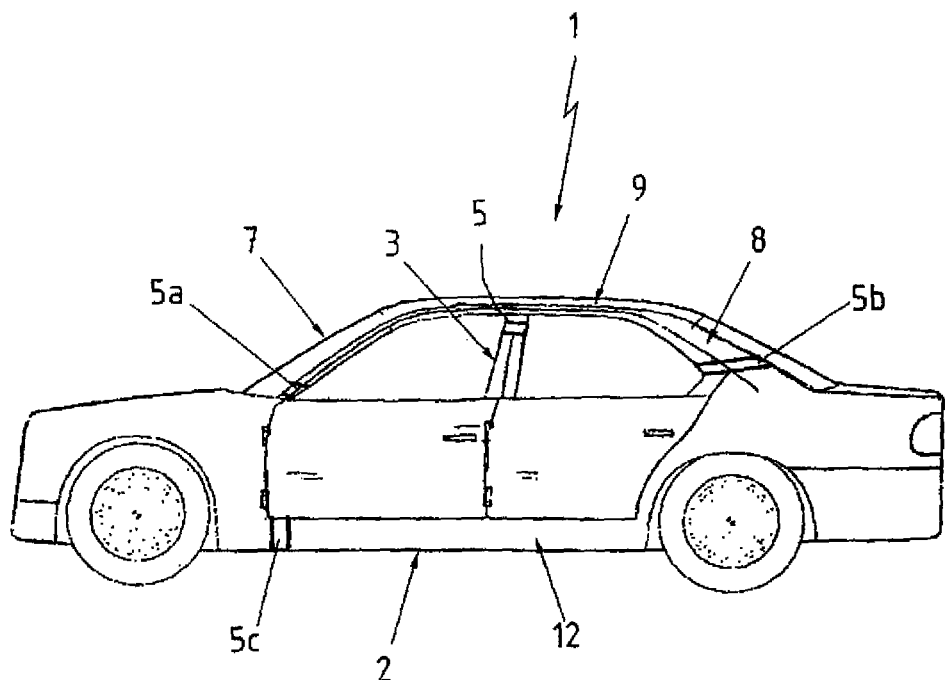
FIG. 1 shows a diagram of an automobile in a side view.
Figure 2:
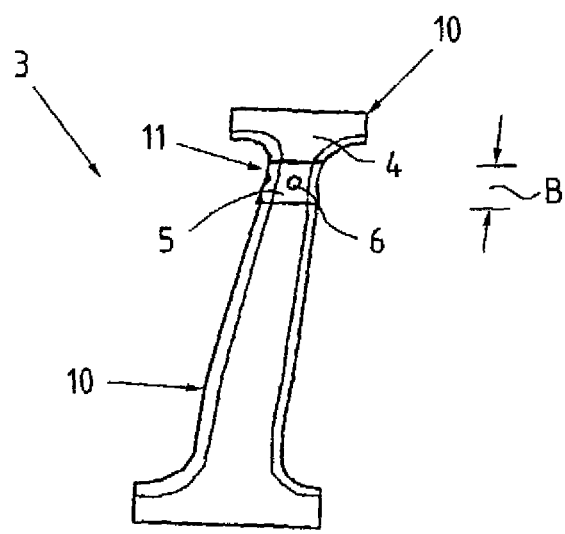
FIG. 2 shows, on an enlarged scale, a structural component of the automobile of FIG. 1.

An automobile in form of a passenger car is shown in FIG. 1 with the reference symbol 1. The body structure 2 of the automobile 1, which is not shown in detail, has several structural components made of high-strength or ultra-high-strength material, wherein one structural component 3 in form of the B-column is emphasized in FIG. 1, with FIG. 2 showing an exemplary enlargement.

The structural component 3 has on its top end 4 a predetermined cutting location 5 for applying a separating tool which is not shown in detail. The width B of the predetermined cutting location 5 is less than 50 mm. The strength of the region 11 with the predetermined cutting location 5 is less than the strength of the remaining region 10 of the structural component 3.

The predetermined cutting location 5 can be detected with an unillustrated sensor. To this end, a transponder 6 which is only schematically indicated may be associated with the predetermined cutting location 5.

The A-column 7 and the C-column 8 of the body structure 2 are provided with predetermined cutting locations 5a, 5b. Unlike the predetermined cutting location 5 on the B-column, the predetermined cutting locations 5a, 5b of the A- and C-column are located at the lower end, adjacent to the windowsill.

In the exemplary embodiment of FIG. 1, a predetermined cutting location 5c is also provided in the forward region of a rocker panel 12 of the body structure 2, adjacent to the A-column. If the automobile 1 is jacked up here after having previously been weakened in the region of the predetermined cutting location 5c and after the roof has been separated at the predetermined cutting locations 5, 5a, 5b, the floor group of the automobile 1 collapses, causing the passenger compartment to open towards the top, thereby facilitating rescue and recovery of the occupants.

In order to be able to separate the body structure 2 in an accident when occupants are trapped in the automobile 1, the rescuers determine, for example based on a rescue map matched to this automobile 1, the exact location of all predetermined cutting locations 5, 5a, 5b, 5c of the various structural components 3, 7, 8, 12 to be separated, and apply at these locations the separating tools, allowing the roof 9 of the body structure 2 to be cut off and the occupants to be rescued.

The region 11 of a structural component of reduced strength (for example 3) with the predetermined cutting location 5 can be produced during a hot-forming process in an unillustrated tool or during heat treatment following a forming process in a tool.

This can also be performed by holding the region 11 having the predetermined cutting location 5 so as not to be in contact with the tool while a steel sheet is hot-formed in the tool. For example, to prevent warpage of the structural component 3, the region 11, which does not make contact with the tool and includes the predetermined cutting location 5, is heated during the hot-forming process in the tool for a limited time. After heating, this section of the tool can be cooled.

During hot-forming in the tool, a material with a lower thermal conductivity compared to the material in the rest of the tool can be used in the region 11 of the predetermined cutting location 5.

If the structural component 3 is initially formed and thereafter heat-treated, then the region 11 with the predetermined cutting location 5 can be subjected for a limited time, within the context of the heat treatment, to a tempering or soft-annealing operation.

A transponder 6 may also be associated with the region having the predetermined cutting location 5 to more clearly indicate to the rescuers the region 11 having the predetermined cutting location 5 and to shorten the rescue time.

What is claimed is:

1. A body structure for an automobile, comprising:
   a structural component made of a high-strength steel sheet, and
   a predetermined cutting location arranged on the structural component and constructed for engagement with a separating tool.

2. The body structure of claim 1, wherein the structural component is a B-column and the predetermined cutting location is arranged on a top end of the structural component.

3. The body structure of claim 1, wherein the structural component is an A-column or a C-column and the predetermined cutting location is arranged on a bottom end of the structural component.

4. The body structure of claim 1, wherein the structural component is a rocker panel and the predetermined cutting location is located adjacent to an A-column.

5. The body structure of claim 1, wherein the predetermined cutting location has a width of less than 100 mm, said width measured along a longitudinal direction of the structural component.

6. The body structure of claim 1, wherein the predetermined cutting location has a width of less than 75 mm, said width measured along a longitudinal direction of the structural component.

7. The body structure of claim 1, wherein the predetermined cutting location has a width of less than 50 mm, said width measured along a longitudinal direction of the structural component.

8. The body structure of claim 1, wherein the predetermined cutting location is constructed to be detectable with a sensor.

9. The body structure of claim 1, wherein the predetermined cutting location comprises a transponder reacting to a sensor.

10. A method for producing the structural component of claim 1, comprising the steps of:
    forming a steel sheet, and
    during or after the forming step, generating the structural component by subjecting the formed steel sheet to a heat treatment thereby forming a first region having high strength and at least one second region having reduced strength as the predetermined cutting location.

11. The method of claim 10, wherein the forming step includes hot-forming of the steel sheet in a tool, and wherein the at least one second region is held without making contact with the tool.

12. The method of claim 11, wherein the at least one second region is brought to a temperature of remaining regions of the structural component following a critical process time.

13. The method of claim 10, wherein the at least one second region is cooled with water or compressed air after hot-forming.

14. The method of claim 10, wherein during the hot-forming process, a region of the tool adjacent to and spaced from the at least one second region is heated for a limited time.

15. The method of claim 14, wherein the region of the tool adjacent to and spaced from the region is cooled after being heated.

16. The method of claim 10, wherein the tool comprises materials having different thermal conductivities, with a tool material having a lower thermal conductivity being used in the at least one second region compared to a material used in the first region.

17. The method of claim 10, further subjecting the at least one second region for a limited time to a tempering or soft-annealing operation.

18. The method of claim 10, further arranging a transponder in the at least one second region.

* * * * *